(12) United States Patent
Pance

(10) Patent No.: US 9,332,167 B1
(45) Date of Patent: May 3, 2016

(54) MULTI-DIRECTIONAL CAMERA MODULE FOR AN ELECTRONIC DEVICE

(71) Applicant: Amazon Technologies, Inc., Reno, NV (US)

(72) Inventor: Aleksandar Pance, Saratoga, CA (US)

(73) Assignee: Amazon Technologies, Inc., Reno, NV (US)

( * ) Notice: Subject to any disclaimer, the term of this patent is extended or adjusted under 35 U.S.C. 154(b) by 561 days.

(21) Appl. No.: 13/681,847

(22) Filed: Nov. 20, 2012

(51) Int. Cl.
*H04N 5/225* (2006.01)
*H04N 13/02* (2006.01)

(52) U.S. Cl.
CPC ......... *H04N 5/2258* (2013.01); *H04N 13/0242* (2013.01)

(58) Field of Classification Search
CPC ................................................... H04N 13/025
USPC ............... 348/47, 159, 218.1, 222.1; 345/173
See application file for complete search history.

(56) References Cited

U.S. PATENT DOCUMENTS

| | | | |
|---|---|---|---|
| 6,150,708 A | | 11/2000 | Gardner |
| 2002/0062787 A1* | | 5/2002 | Hashizume et al. ........... 118/664 |
| 2010/0053107 A1* | | 3/2010 | Tsuzaki et al. ................. 345/173 |
| 2010/0253642 A1* | | 10/2010 | Tsuzaki et al. ................. 345/173 |
| 2011/0058053 A1* | | 3/2011 | Roh ............................ 348/218.1 |
| 2011/0085042 A1* | | 4/2011 | Lee et al. ....................... 348/159 |
| 2012/0274800 A1* | | 11/2012 | Vakil ........................... 348/222.1 |
| 2013/0063641 A1 | | 3/2013 | Venezia |
| 2014/0300746 A1* | | 10/2014 | Adachi ......................... 348/159 |
| 2014/0336461 A1* | | 11/2014 | Reiter et al. .................. 600/111 |
| 2015/0018622 A1* | | 1/2015 | Tesar et al. .................... 600/202 |

FOREIGN PATENT DOCUMENTS

WO        2011149451 A1     12/2011

OTHER PUBLICATIONS

Co-pending U.S. Appl. No. 14/319,427, filed Jun. 30, 2014.
Co-pending U.S. Appl. No. 14/319,501, filed Jun. 30, 2014.

* cited by examiner

*Primary Examiner* — Paulos M Natnael
(74) *Attorney, Agent, or Firm* — Seyfarth Shaw LLP; Ilan N. Barzilay; David A. Klein

(57) ABSTRACT

Approaches are described for selectively managing imaging elements on a computing device. A portable computing device can include a camera module that can manage the capture and/or processing of image data. The module can include a first imaging element attached to a first surface of a substrate and a second imaging element attached to a second surface of the substrate, the first surface being opposite the second surface. The image module can also include an image signal processor (ISP) or other dedicated imaging processing circuitry attached to or otherwise in connection with the substrate. The circuitry can be shared between the imaging elements, and can be configured to receive a selection of one of the imaging elements and process (e.g., depth pixel correction, etc.) captured image data based on the selected imaging element.

19 Claims, 6 Drawing Sheets

MULTI-DIRECTIONAL CAMERA MODULE FOR AN ELECTRONIC DEVICE

BACKGROUND

As computing devices offer increasing processing capacity and functionality, users are able to operate these devices in an expanding variety of ways. For example, mobile devices are increasingly offering multiple high quality cameras that enable additional types of functionality. In some devices, these cameras are capable of capturing high resolution images and/or videos, and can also be used to provide three-dimensional (3D) image capture for both still and video imaging. However, a downside to providing cameras that can capture high resolution images, and/or are capable of 3D image capture is the fact that high resolution and stereo cameras in mobile devices typically are relatively large with respect to these devices, particularly when these cameras include auto-focusing mechanisms. A mobile device such as a smart phone can have difficulty fitting two 1.0 cubic centimeter high resolution cameras within the desired form factor of the device. Further, such cameras can be relatively expensive and resource intensive to operate. These and other limitations can prevent certain small mobile devices from offering high resolution and 3D imaging within various constraints (e.g., size and pricing) placed on those devices.

BRIEF DESCRIPTION OF THE DRAWINGS

Various embodiments in accordance with the present disclosure will be described with reference to the drawings, in which.

DETAILED DESCRIPTION

Figure 1A:
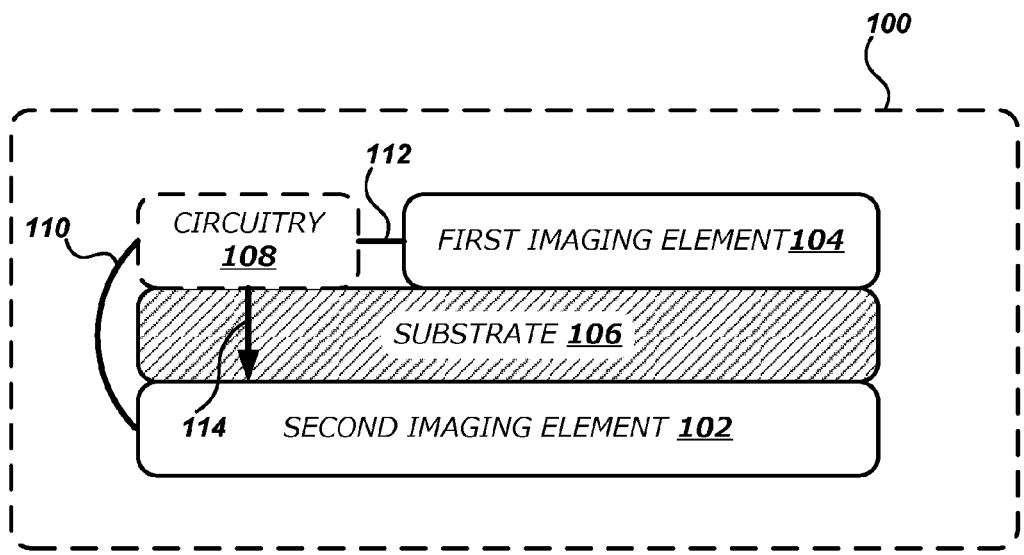
FIGS. 1A-1B illustrate example implementations where a dedicated image processor is shared between multiple imaging elements, and configured to selectively manage data from each of the imaging elements, in accordance with an embodiment.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for managing the capture and/or processing of one or more images or video, via an electronic device. In particular, various embodiments enable a computing device (e.g., a mobile phone) or other portable computing device to use an image capture module having two or more camera assemblies to capture image or video data, the module being smaller than two separate camera assemblies, and allowing for the sharing of image capture elements for a reduction in cost and space.

In accordance with various embodiments, a portable computing device can include an image capture module or other camera module that can manage the capture and/or processing of image data. The module can include a first imaging element (such as a camera or image sensor) attached to a first surface of a substrate (such as a single or multi-layer printed circuit board assembly) and a second imaging element attached to a second surface of the substrate, the first surface being opposite the second surface. In various other embodiments, more than two imaging elements can be included in a module. The first and second imaging elements can each include an image sensor and a camera lens, where the first imaging element can be configured to capture image data (such as image or video data) from an opposing or different field of view of the second imaging element. For example, the first imaging element can be used as a rear-facing camera and the second imaging element can be used as a front-facing camera, where the image sensor of the first imaging element can be a relatively large, high resolution image sensor (e.g., 5MP or higher), with the image sensor of the second imaging element being a smaller image sensor having a lower resolution (e.g., 2MP or lower) and being of a smaller size in at least some embodiments, although similar image sensors or other combinations can be utilized as well within the scope of the various embodiments.

The image capture module can also include dedicated image processing circuitry (such as an image signal processor (ISP) circuitry or other image processing circuitry) attached to, or otherwise in connection with, the substrate. The circuitry can be connected to the first and second imaging elements, and can be configured to selectively, or alternatively, receive image data from one of the imaging elements at a time, process (e.g., correct for lens correction, depth pixel correction, format conversation, etc.) captured image data based on the selected imaging element, and provide the processed image data to a device processor or other system processor for further processing (such as to enhance or otherwise modify the image). In at least some embodiments, each imaging element can include readout circuitry and memory for storing the image data until that data is able to be processed by the shared circuitry of the image capture module. In other embodiments, each imaging element has dedicated image processing circuitry, while in some other embodiments, the image processing circuitry is shared between the imaging elements.

Various other functions and advantages are described and suggested below as may be provided in accordance with the various embodiments.

As mentioned above, it can be desirable to further reduce the amount of power consumption and/or space used by cameras in conventional electronic devices, where these devices can include one or more cameras. For example, the device can include one or more front-facing cameras for video chat or other such purposes and one or more rear-facing cameras to capture high-resolution images. These cameras typically come with auto-focusing mechanisms, which can further increase the form factor or footprint of the camera assembly. In some embodiments, the cameras can be on the order of about 1.0 cubic centimeters in volume, where the overall size of the cameras can complicate arranging the front and rear-facing cameras such that there is little or no space for other device components. As discussed, the size of such an assembly can be undesirable for at least certain designs of devices. Further, having multiple separate camera assemblies can be processor and/or memory intensive, and the power required to operate these devices can potentially be more than desired for portable or small mobile devices. Further, having to have separate circuitry for each camera can be expensive in terms of power consumption and space.

Accordingly, systems and methods in accordance with various embodiments provide for selectively managing imaging elements to capture image and/or video data while reducing the size and power consumption of such image capture modules.

Figure 1B:
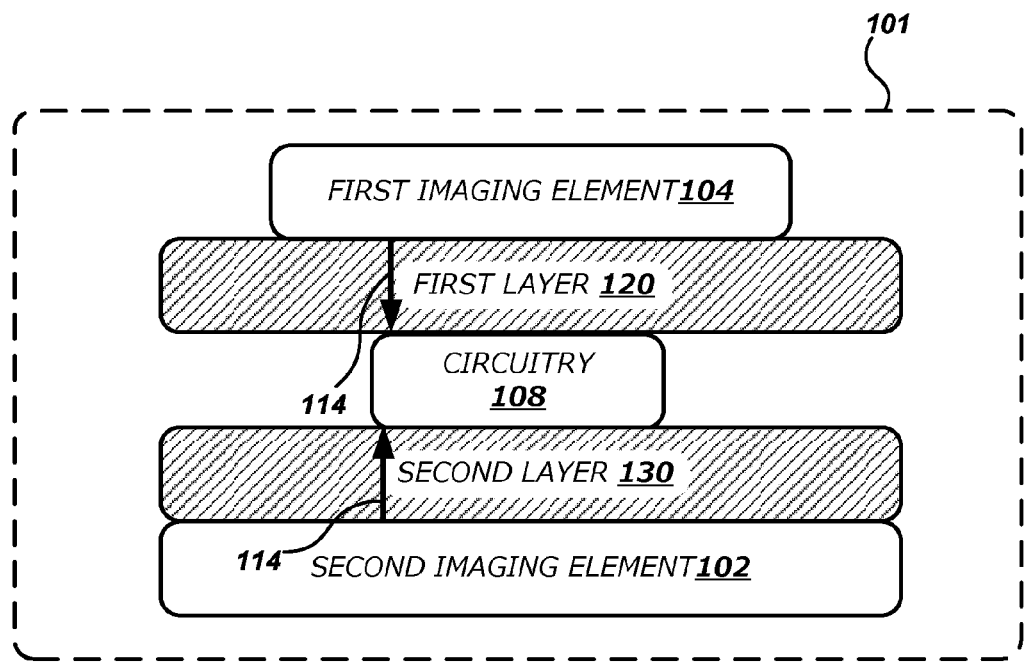

FIGS. 1A-1B illustrate example implementations where dedicated image processing circuitry is shared between multiple imaging elements, and configured to selectively manage data from each of the imaging elements, in accordance with an embodiment. As shown in FIG. 1A, an image or video capture module 100 includes a first imaging element 104 (herein also known as a camera, camera assembly or image sensor), a second imaging element 102, a camera substrate 106, and a dedicated image processor or other image processing circuitry 108. Additionally, the module can include other components, such as a lensing system, an out of focus system, and an optical image stabilization system, among others, associated with each of the first and second imaging elements. The module can be included as part of a computing device (such as a mobile phone or other portable computing device) that has one or more cameras (such as front and rear-facing cameras), and can be used to capture image or video data. It should be understood that any electronic device capable of receiving, determining, and/or processing input can include one or modules in accordance with various embodiment discussed herein, where the device can be, for example, an electronic book reader, desktop computers, notebook computers, personal data assistants, video gaming consoles, television set top boxes, smart televisions, and portable players, among others.

The device can utilize some of the same elements as a conventional device, such as may include a display screen and a front and rear-facing camera. The device can also include high and/or low-resolution cameras that can include auto-focusing elements for use in still image capture or two-dimensional video capture. The device can include other elements useful for imaging as well, such as a light sensor for determining an amount of ambient light and a white light LED, or other such illumination element, useful in illuminating objects within at least a portion of a field of view of the camera. Each imaging element may be, for example, a camera including a complimentary metal-oxide semiconductor (CMOS) device, a motion detection sensor, a charge coupled device (CCD), an infrared sensor, a quantum dot imager, a gallium arsenide sensor, or any other appropriate image capturing technology.

The first imaging element 104 is attached or otherwise connected to a first surface of the substrate 106, and the second imaging element 102 is attached or otherwise connected to a second surface of the substrate, the first surface being opposite the second surface. The substrate can be a solid substance onto which a layer of another substance can be applied, and to which that second substance adheres. In this instance, this can be, but is not limited to a thin slice of material such as silicon, silicon dioxide, aluminum oxide, sapphire, germanium, gallium arsenide (GaAs), an alloy of silicon and germanium, or indium phosphide (InP), a printed circuit board (PCB) or any board that can used to mechanically support and electrically connect electronic components using conductive pathways, tracks or signal traces etched from copper sheets laminated onto a non-conductive substrate.

The first and second imaging elements can each include an image sensor and a camera lens (not shown), and can be used to capture image or video data. For example, the first and second imaging elements can be any imaging sensor, such as a front-side illuminated or a back-side illuminated sensor, where each imaging element can include a color filer and be made of one or more metal layers. The metal layers can be stacked on, or situated below a substrate or other substrate (not shown). For example, in a front-side illuminated sensor, light is received at the camera lens, and passes through a color filter and one or more metal layers before being received at a diode or other light detector situated on a substrate. In a back-side illuminated sensor, light is received at the camera lens, and passes through a color filter before being received at a diode or other light detector situated on a substrate that is situated on one or more metal layers.

The first imaging element 104 can be used as a front facing camera and the second imaging element 102 can be used as a rear-facing camera of a portable computing device, where the front and rear-facing cameras can be positioned to capture image or video data from opposing fields of view. That is, the first imaging element can be configured to capture image data for a first field of view and the second imaging element can be configured to capture image data for a second field of view, the second field of view being opposite the first field of view, such as is the case of a device having front and rear-facing cameras.

In some embodiments, the footprint of the first imaging element 104 can be smaller than the footprint of the second imaging element 102 because, e.g., the first imaging element 104 can include a low resolution sensor (e.g., a sensor of 2MP or lower) that requires a smaller footprint than the second imaging element 102 that includes a high resolution sensor (e.g., a sensor of 8MP or higher). Accordingly, as shown in FIG. 1A, the circuitry 108 can be positioned with respect to the first imaging element 104 on the first surface of the substrate 106 without requiring additional space, and can share or otherwise reside on the first surface of the substrate 106 with the first imaging element 104. This is, in part, because the size of the substrate 106 is determined by the second imaging element 102 which is used to determine the size of the substrate (at least the x-y footprint) given that the footprint of the second imaging element 102 is, in this example, larger than the footprint of the first imaging element 104.

Accordingly, in accordance with various embodiments, two imaging elements can be combined into one image capture module 100, where the same circuitry 108 can be shared or otherwise used by both imaging elements. Additionally, the x-y footprint of the combined imagining elements can be smaller than having two separate imaging elements (where each imaging element includes its own circuitry). This can provide for more functionality in a smaller x-y footprint and thickness.

In accordance with various embodiments, the circuitry 108 is connected to the first and second imaging elements using conductive pathways, tracks or signal traces 112 etched onto the substrate, for example. It should be noted that other wire routing techniques to connect or otherwise provide, transfer, or communicate data between the imaging elements and circuitry can be used within the scope of the embodiments described herein, as will be evident to one of ordinary skill in the art, such as through hole technology where a conducting path 114 is created from the circuitry 108 to an imaging element, surface mount technology, wire bridges 110, or other wire routing techniques.

In accordance with an embodiment, the dedicated image processor or other image processing circuitry 108 can be any image signal processor (ISP) or other processing device that can perform signal processing for which the input is an image (or video), and where image or video data can be analyzed, interpreted and/or manipulated to generate an output, the output of image processing being either an image or a set of characteristics or parameters related to the image. The circuitry can be a specialized digital signal processor, or other processing component, that can perform a range of tasks, such as, but not limited to, Bayer transformation, demosaicing, noise reduction, image sharpening, lens correction, depth pixel correction, and format conversion.

Additionally, in accordance with various embodiments, the circuitry 108 can be configured to selectively, or alternatively, receive image data from one of the imaging elements at a time, process (e.g., correct for lens correction, depth pixel correction, format conversation, etc.) captured image data based on the selected imaging element, and provide the processed image data to a device processor or other system processor for further processing (such as to enhance or otherwise modify the image).

For example, a camera associated with one of the imaging elements can be enabled, such as a rear-facing camera, and the circuitry can receive image data from the rear-facing camera. This can occur, for example, when a user starts an image capture program on a computing device, where starting the program can enable the rear-facing camera. The user can switch or otherwise optionally enable the front-facing camera by, e.g., selecting an option on the device that switches between the rear-facing camera and the front-facing camera, and the circuitry can then receive image data from the front-facing camera. Additionally or alternatively, the user can start a video chat program or other such program that can enable use of the front-facing camera. In any situation, captured image data from the front, rear, or another camera can be received and processed by the circuitry.

In accordance with an embodiment, one of the imaging elements can be used to capture image or video data, and the circuitry can access a configuration file to determine how to process captured image or video data for one of the imaging elements. For example, the configuration file can include image signal processing algorithms and/or settings operable with one or more imaging elements, where in some instances the signal processing algorithms are particular to an imaging element, and in other instances the signal processing algorithms can be used with any imaging element. Thus, based at least in part on the selected imaging element, the circuitry can use the configuration file to perform one or more image signal processing algorithms (such as to process a digital image data or to compress video data), and/or set one or more settings such as a frame rate or exposure time or some other functionality associated with an imaging element.

In accordance with an embodiment, in the situation where both cameras are operating at the same time, a multiplexer (mux) or other such component can be used to select and/or switch between the two (or more) imaging elements such that both imaging elements have access to the circuitry. For example, the mux can be used to select imaging element 104, where image or video data captured by imaging element 104 is forwarded or otherwise communicated to the circuitry 108. In this way, the data captured by both imaging elements is processed concurrently using the shared circuitry 108. In other embodiments, the mux can route image data captured by one of the imaging elements to the circuitry 108, and can route image data captured by the other imaging element to a system processor or other processor separate from the circuitry 108. In this way, the image data being captured by the two imagining elements can be processed concurrently (i.e., some data by the circuitry 108, and other data by the system processor). In various other embodiments, the mux can route data captured by any one of (or both of) the imaging elements directly to a system processor, and thus, can bypass the circuitry 108.

Other arrangements are also possible, where a mux is not used to route the captured data. In this case, any of (or all of) the imaging elements can directly communicate captured data to shared circuitry (such as circuitry 108), to a system processor, between the shared circuitry and system processor, or in the situation where each imaging element has dedicated circuitry, each imaging element can communicate captured data directly to their respective dedicated circuitry.

In accordance with an embodiment, other arrangements of the dedicated image processor or circuitry 108 relative to the imaging elements are possible with respect to a multi-layer PCB assembly. For example, as shown in FIG. 1B, an image capture module 101 shows the circuitry 108 between imaging element 104 and imaging element 102, where the imaging elements can be cameras or some other camera assembly. In this case, each imaging element is attached, connected or otherwise secured to a respective substrate layer, where the first imaging element is connected to first substrate layer 120, and the second imaging element is connected to a second substrate layer 130.

In various embodiments, the imaging elements can be connected (or in communication with) to the circuitry 108 in a number of ways, such as by a trace or other connection through or around the substrate, where the lines/traces can be printed or otherwise formed on at least one of the layers. As shown in FIG. 1B, imaging elements 104 and 102 are in connection with circuitry 108 through connection 114 (such as a trace or other connection). As described above, the two imaging elements can be combined into one module 101, and the same circuitry 108 can be shared or otherwise used by both imaging elements. The ability to share the circuitry advantageously provides for more functionality in a smaller x-y footprint and thickness than two separate imaging elements. It should be noted that FIGS. 1A-1B are examples of imaging modules, and that other arrangements imaging elements and circuitry are possible. For example, the first and second imaging elements can be stacked or otherwise connected directly to one another. In other embodiments, a module can include image circuitry for each imaging element. Thus, a module having two imaging elements would have dedicated circuitry for each element.

Figure 2:
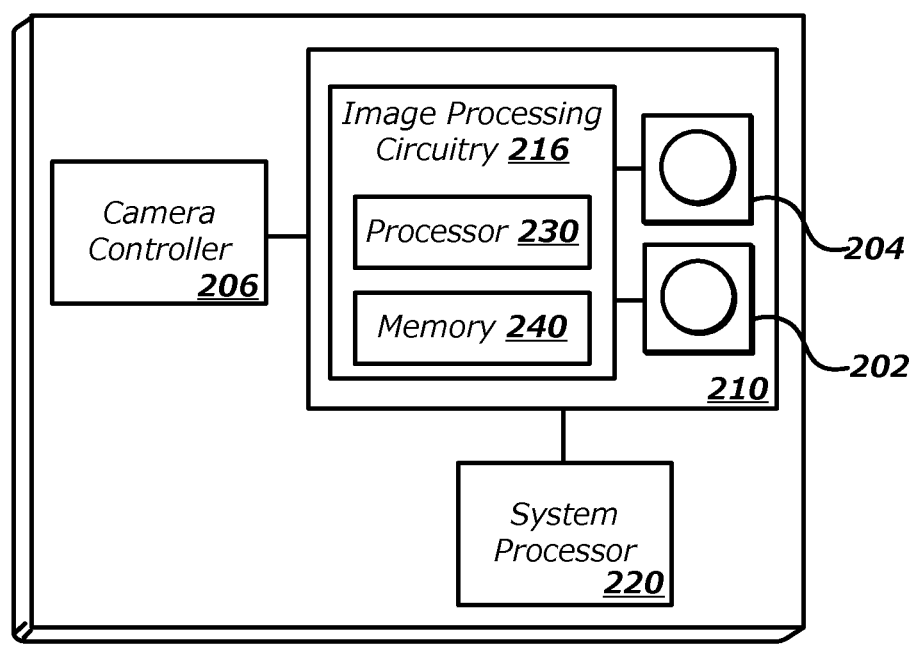
FIG. 2 illustrates an example set of basic components of a computing device that can interact with an image capture module, such as the module described with respect to FIGS. 1A-1B, in accordance with an embodiment.

FIG. 2 illustrates an example set of basic components of a computing device that can interact with an image capture module, such as the module described with respect to FIGS. 1A-1B. In this example, image capture module 210 can include dedicated image processing circuitry 216, where the image processing circuitry is shared between a pair of imaging elements (202, 204), such as a pair of cameras. The image processing circuitry can include an on-chip processor 230 or other control processor that can implement image processing functions or other functions, and on-chip memory 240 or other storage element to store the functions and/or other data. In one embodiment, at least some system-level control and image processing functions can be implemented by the image processing circuitry. Such functions enable a sensor and related components to function as a camera without accessing external control circuitry, principally sourcing of clocks to serially read out the data including options for decimation (skipping pixels, or groups of pixels during readout), binning (summing adjacent groups of pixels), windowing (limiting serial readout to a rectangular region of interest), combinations of decimation and windowing, aperture correction (correction of the lens vignetting), and lens correction (correction of the lens geometric distortion, at least the radially symmetric portion). Other examples of on-chip image-processing functions include "blob" or region detection for segmenting fingers for hand gestures and face detection and tracking for head gestures. Various other types of functionality can be provided on the imaging elements as well in other embodiments.

The imaging elements can include lenses, image sensors, or optical filters and other such components. In accordance with an embodiment, imaging element 204 can be used as a front-facing camera and imaging element 202 can be used as a rear-facing camera of a portable computing device. As described above, the imaging elements can be combined into one module 210, where the same circuitry 216 can be shared or otherwise used by both imaging elements to save on power consumption and space (such as x-y footprint).

The module can access a processing device such as a system processor 220, or other such element; a camera controller 206; and/or any other element or controller such as an illumination controller that can be used to control and/or adjust an amount of illumination used to capture image or video data. It should be understood, however, that other elements or controllers such as the illumination controller and the camera controller can alternatively (or additionally) be part of the circuitry 216 or part of the system processor 220, and that other controllers can be used in conjunction with, or used instead of the illumination and camera controller.

In accordance with an embodiment, the system processor 220 can be utilized for various timing control and image processing functions, and in at least some embodiments can perform additional processing on image or video data captured by the imaging elements, where the additional processing and/or at least some of these actions can be beyond the capability of the circuitry 216 processing of the imaging elements.

The camera controller 206, in accordance with an embodiment, can be used to enable/disable an image or video capture mode, where the camera controller can send a signal, or other such communication to the circuitry 216 that one of the imaging elements is in operation. The camera controller can perform other functions, such as control the operation of a lens system such as to control photographic lens functions such as zoom, focus, etc.

Figure 3:
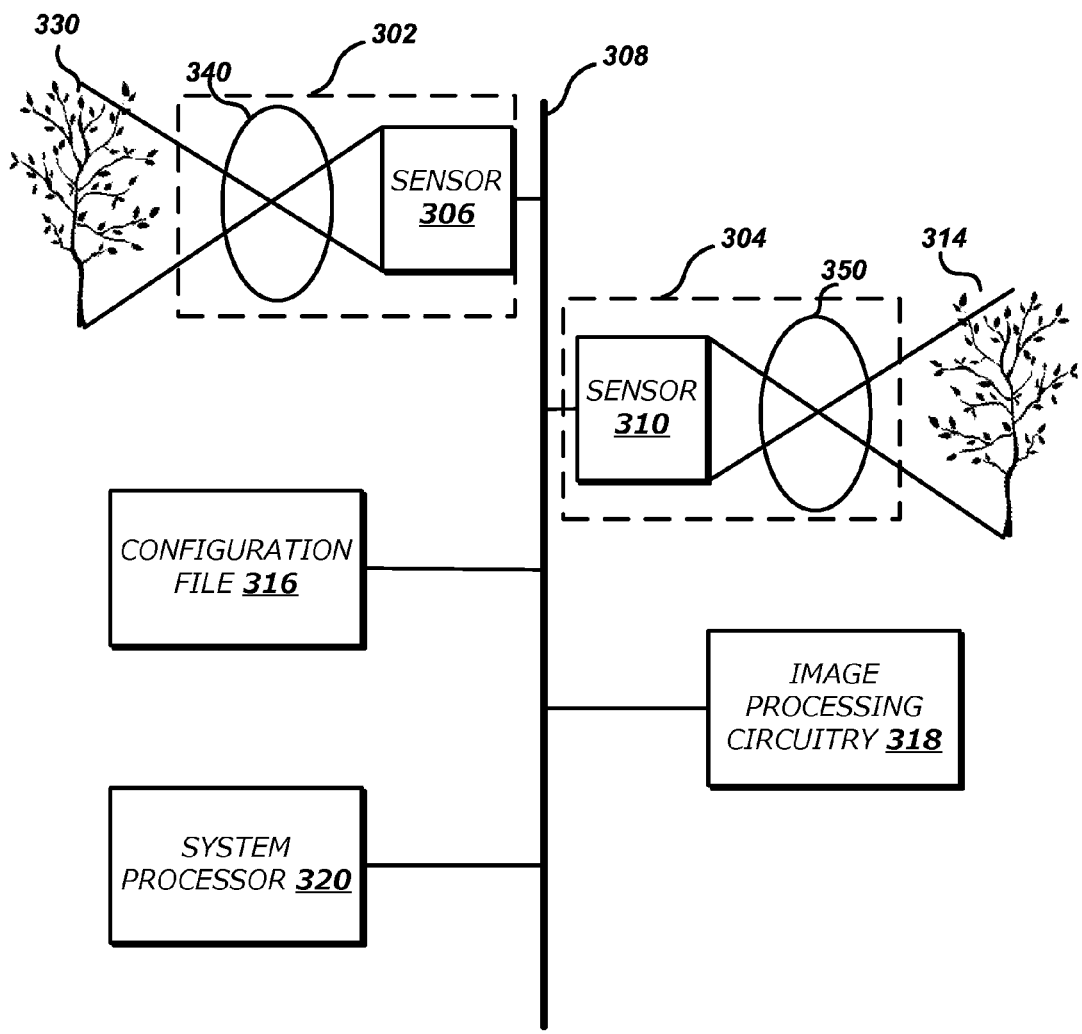
FIG. 3 illustrates a situation where two imagining elements are operating simultaneously, in accordance with an embodiment.

FIG. 3 illustrates a situation where two imagining elements (e.g., cameras) are operating simultaneously, in accordance with an embodiment. In this example, imaging elements 302 and 304 are connected to dedicated image processing circuitry 318 through bus 308, such as a CIS (CMOS Image Sensor) or MIPI (Mobile Industry Processor Interface) bus to transfer image data from the imaging elements to the dedicated image processor, application processor, central processing unit, etc. Imaging element 302 includes image sensor 306 and lens 340, where image sensor 306 can be a low resolution image sensor, such as a sensor that may be used on a front-facing camera. As shown, imaging element 302 is capturing image data of image 330. Imaging element 304 includes image sensor 310 and lens 350, where image sensor 310 can be a high resolution image sensor, such as a sensor that may be used on a rear-facing camera. Also shown is imaging element 304 capturing image data of image 314.

The circuitry can access a configuration file 316, and can provide a level of processing of the image or video data captured from the imaging elements before providing the data to a processing device such as a system processor 320 for further processing. For example, the circuitry can be connected to the first and second imaging elements, and can be configured to selectively, or alternatively, receive image data from one of the imaging elements at a time, and based on the selected imaging element, the circuitry 318 can use the configuration file to identify one or more image signal processing algorithms operable with the selected imaging element to process the captured image or video data. In accordance with an embodiment, the configuration file can include image signal processing algorithms operable with one or more imaging elements, and in some instances the signal processing algorithms are particular to an imaging element (such as high resolution imaging element) and in other instances, the signal processing algorithms can be used with any imaging element (e.g., low and high resolution imaging elements).

In accordance with an embodiment, both imaging elements are capturing image data at the same time, and a multiplexer (not shown) or other such component is used to select and/or switch between the two imaging elements such that both imaging elements have access to the circuitry 318. In this way, the multiplexer (mux) makes it possible for one or more imaging elements to share one device or resource, such as circuitry 318.

The circuitry 318 provides the image data to the system processor 320, where the system processor can perform image enhancement, image restoration, image compression or other image processing. In accordance with an embodiment, image enhancement can include accentuation, or sharpening, of image features such as boundaries, or contrast to make a graphic display more useful for display and analysis; image enhancement can include gray level and contrast manipulation, noise reduction, edge crispening and sharpening, filtering, interpolation and magnification, pseudo coloring, and so on; and image restoration can include filtering the observed image to minimize the effect of degradations, and image compression can include minimizing the number of bits required to represent an image.

Figure 4:
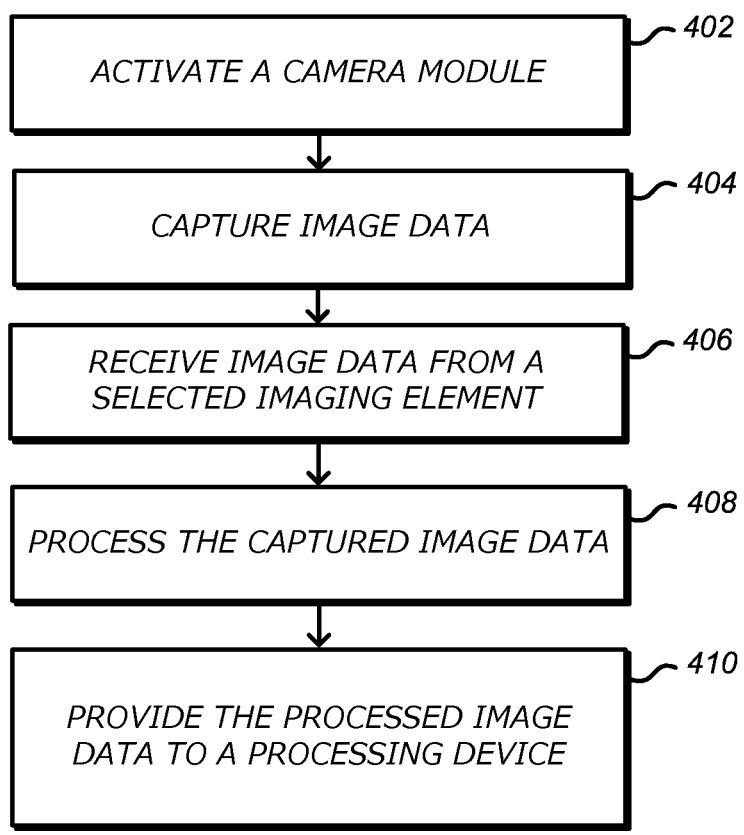
FIG. 4 illustrates an example process for selectively managing imaging elements, in accordance with various embodiments.

FIG. 4 illustrates an example process for selectively managing imaging elements, in accordance with various embodiments. It should be understood that, for any process described herein, that there can be additional or fewer steps performed in similar or alternative orders, or in parallel, within the scope of the various embodiments unless otherwise stated. At step 402, an image capture module or other camera module that can manage the capture and/or processing of image data is activated. In accordance with an embodiment, the module can include a first imaging element (such as a camera) attached to a first surface of a camera substrate (such as a printed circuit board) and a second imaging element attached to a second surface of the camera substrate, the first surface being opposite the second surface. In various other embodiments, more than two imaging elements or image sensors can be in a module.

The first and second imaging elements can each include an image sensor and a camera lens, where the first imaging element can be configured to capture image data (such as image or video data for a first field of view and the second imaging element is configured to capture image data for a second field of view, the second field of view being opposite the first field of view.

In accordance with an embodiment, the image sensor of the first imaging element can be a relatively large, high resolution image sensor, with the image sensor of the second imaging element being a smaller image sensor having a lower resolution and being of a smaller size. In other embodiments, the image sensors can be the same resolution, or the first imaging element can include a relatively small, low resolution image sensor while the second imaging element can include a relatively large, high resolution image sensor.

At step 404, image or video data is captured by one of (or both of) the imaging elements, where capturing the data can include first enabling an imaging element to be used to capture the data. In accordance with various embodiments, enabling one of the imaging elements can include starting an image or video capture application, such as a mobile phone application, where the application can be used to select a front, rear, or other camera. In various embodiments, all imaging elements can be enabled, such as during the use of a video conferencing application where a device having a front and rear camera enables both cameras to capture image data. Each of the cameras (i.e., the front, rear, or other camera) can be associated with an imaging element. For example, the front camera can be associated with a first imaging element, and selecting the front-facing camera can cause the first imaging element to capture image or video data, the captured data to be provided to a dedicated image processor.

At step 406, dedicated image processing circuitry (such as an image signal processor (ISP) circuitry or other image processing circuitry) selectively, or alternatively, receives the data from one of the imaging elements. At step 408, the captured data is processed by the circuitry, where the captured image data is processed to, e.g., correct for lens correction, depth pixel correction, format conversation, etc., based upon the selected imaging element. As described above, the circuitry can be any image signal processor (ISP) or other processing device than can perform signal processing for which the input is an image, and where image or video data can be analyzed, interpreted and/or manipulated to generate an output, the output of image processing being either an image or a set of characteristics or parameters related to the image. The circuitry can be a specialized digital signal processor, or other processing component, that can perform a range of tasks, such as, but not limited to, Bayer transformation, demosaicing, noise reduction, image sharpening, lens correction, depth pixel correction, and format conversion.

At step 410, the processed data is provided to a processing device or other system processor for further processing. For example, the system processor can perform image enhancement, image restoration, image compression or other image processing.

As described above, various embodiments enable a computing device (e.g., a mobile phone) or other portable computing device to capture image or video data using an image capture module that consumes less power and takes up less space than two separate image capture elements. Accordingly, embodiments described herein can provide for image or video applications that can take advantage of the benefits of an image capture module (such as the one described with respect to FIGS. 1A-1B), to perform 3D imaging or video, 360 image or video view, and image-in-image view capabilities, for example.

In accordance with various embodiments, a computing device (such as a mobile phone) that includes front and rear-facing cameras can support 3D imaging using at least two modules, where each module includes two imaging elements. Thus, the front-facing module includes two front-facing cameras and the rear-facing module includes two rear-facing cameras. In this embodiment, the modules can operate in a master/slave arrangement, where one of the modules can be a master module that includes the image processing circuitry and the other module (i.e., the slave module) accesses the image processing circuitry on the master module. In various other embodiments, both modules can include image processing circuitry. In accordance with an embodiment, each module can be used to create a stereo camera, which can be a type of camera with two or more lenses (i.e., a camera with a module having two imaging elements) with a separate image sensor or film frame for each lens, which can allow the camera to capture three-dimensional images. For example, the image data from the front-facing module having a first imaging element and a second imaging element (i.e., two front-facing cameras) can be processed by the image processor to generate a 3D or stereoscopic image. In this manner, using one or more image capture modules can advantageously allow mobile devices to offer 3D imaging while consuming less power and using less space.

In accordance with an embodiment, using one module that includes two imaging elements can provide for 360 degree image or video view. For example, one imaging element can be used as a front-facing camera, while the other imaging element can be used as a rear-facing camera. The front and rear-facing cameras can be operated concurrently to capture image or video data in the front and in the rear of a computing device (such as a mobile phone) having the module. In the instance where a user is operating the device for a video call, the front camera can be used to capture the user, and the rear camera can be used to capture view of the user's surroundings. The video from the two imaging elements can be interlaced or time multiplexed to create a 360 degree view of the user and the user's surroundings.

Similarly, in accordance with an embodiment, the module can be used to provide image-in-image video or an image-in-image picture. In this instance, similar to as described above, the front and rear-facing cameras can be operated concurrently. Whereas in the 360 degree view, the user is "placed" or appears to be included in the user's surrounding, in the image-in-image situation, a view of the user captured using the front-facing camera and a separate view captured by the rear-facing camera can simultaneously be displayed on a display element of a portable computing device.

In accordance with another embodiment, the module can be used to provide for symmetric/asymmetric viewing. For example, image data can be received from a first imaging element and a second imaging element of the module concurrently, where the image data captured from the first imaging element is different (e.g., of a lower resolution and a lower frame rate) than the image data captured from the second imaging element. Thereafter, the module can process the image data from the imaging elements by, e.g., aggregating or combining the image data from the first imaging element and the second imaging element to generate an image having a combined frame rate twice the frame rate of the second imaging element, and a combined frame size twice a width of a frame size as determined by the resolution of the image data captured by the second imaging element.

It should be noted that other imaging applications can be used within the scope of the embodiments described herein, as will be evident to one of ordinary skill in the art, where one or more image capture modules can be used to provide such functionality in a smaller x-y footprint and thickness while using less resources and power consumption than conventional approaches.

Figure 5:
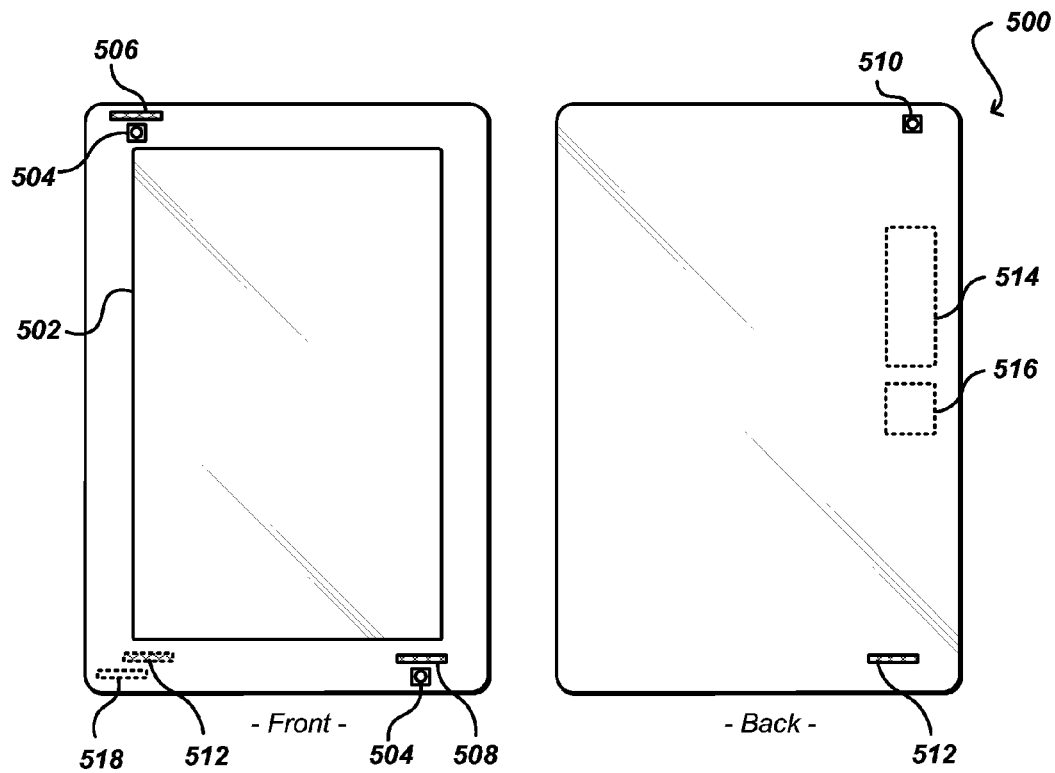
FIG. 5 illustrates front and back views of an example portable computing device that can be used in accordance with various embodiments.

FIG. 5 illustrates front and back views of an example electronic computing device 500 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 500 has a display screen 502 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 504 on the front of the device and at least one image capture element 510 on the back of the device. It should be understood, however, that image capture elements could also, or alternatively, be placed on the sides or corners of the device, and that there can be any appropriate number of capture elements of similar or different types. Each image capture element 504 and 510 may be, for example, a camera, a charge-coupled device (CCD), a motion detection sensor or an infrared sensor, or other image capturing technology.

As discussed, the device can use the images (e.g., still or video) captured from the imaging elements 504 and 510 to generate a three-dimensional simulation of the surrounding environment (e.g., a virtual reality of the surrounding environment for display on the display element of the device). Further, the device can utilize outputs from at least one of the image capture elements 504 and 510 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 508 on the front side, one microphone 512 on the back, and one microphone 506 on or near a top or side of the device. In some devices there may be only one microphone, while in other devices there might be at least one microphone on each side and/or corner of the device, or in other appropriate locations.

The device 500 in this example also includes one or more orientation- or position-determining elements 518 operable to provide information such as a position, direction, motion, or orientation of the device. These elements can include, for example, accelerometers, inertial sensors, electronic gyroscopes, and electronic compasses.

The example device also includes at least one communication mechanism 514, such as may include at least one wired or wireless component operable to communicate with one or more electronic devices. The device also includes a power system 516, such as may include a battery operable to be recharged through conventional plug-in approaches, or through other approaches such as capacitive charging through proximity with a power mat or other such device. Various other elements and/or combinations are possible as well within the scope of various embodiments.

Figure 6:
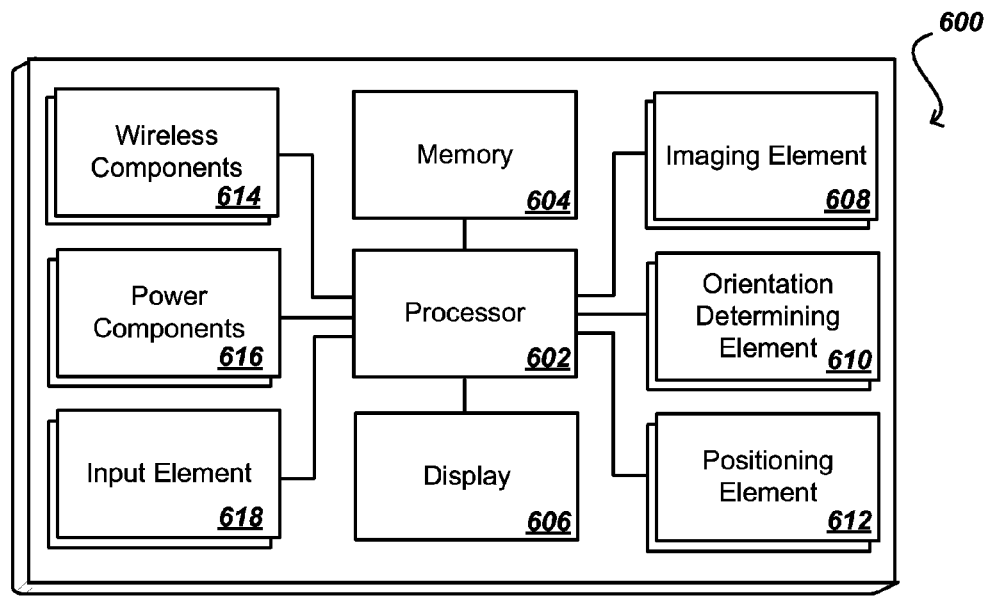
FIG. 6 illustrates an example set of basic components of a portable computing device, such as the device described with respect to FIG. 5.

FIG. 6 illustrates a set of basic components of an electronic computing device 600 such as the device 500 described with respect to FIG. 5. In this example, the device includes at least one processing unit 602 for executing instructions that can be stored in a memory device or element 604. As would be apparent to one of ordinary skill in the art, the device can include many types of memory, data storage, or computer-readable media, such as a first data storage for program instructions for execution by the processing unit(s) 602, the same or separate storage can be used for images or data, a removable memory can be available for sharing information with other devices, and any number of communication approaches can be available for sharing with other devices. The device typically will include some type of display element 606, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 608, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 600 also includes at least one orientation determining element 610 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 600. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 612 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 614 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 618 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 7:
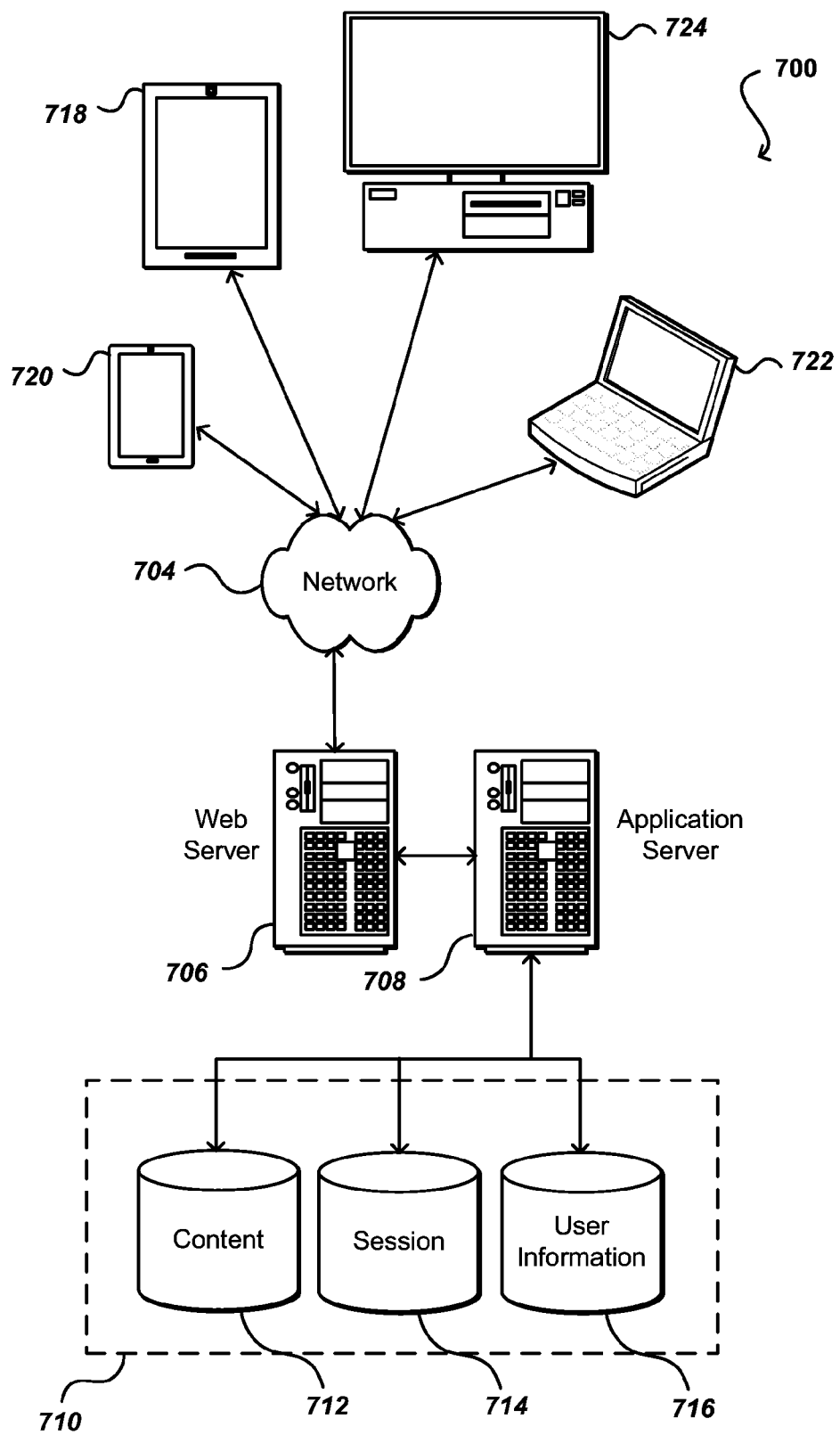
FIG. 7 illustrates an example of an environment for implementing aspects in accordance with various embodiments.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes electronic client devices 718, 720, 722, and 724, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client devices 718, 720, 722, and 724 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 718, 720, 722 and 724. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing system for selectively managing cameras, comprising:
   at least one processor; and
   an image capture module, the image capture module including:
      a first camera attached to a first surface of a first camera substrate,
      a second camera attached to a second surface of the first camera substrate, the first surface being opposite the second surface, and the first and second cameras each including an image sensor and a camera lens, the first camera is configured to capture image data for a first field of view and the second camera is configured to capture image data for a second field of view, the second field of view at least partially overlapping the first field of view, and an image processor attached to the first camera substrate, wherein the image processor is in communication with the first and second cameras, and the image processor is configured to:

receive first image data from the first camera and second image data from the second camera; and process the first image data and the second image data to generate a stereoscopic image.

2. The computing system of claim 1, wherein the first and second image data are captured substantially concurrently, and wherein one of the first image data or the second image data is processed one at a time.

3. A computer system, comprising:
at least one processor;
a first imaging element having a first field of view and a second imaging element having a second field of view, the second field of view at least partially overlapping the first field of view;
a first substrate having attached thereto the first imaging element and the second imaging element; and
an image processor in communication with the first imaging element and the second imaging element,
wherein the first imaging element and the second imaging element are part of an image capture module, and image processor is configured to:
receive first image data from the first imaging element;
receive second image data from the second imaging element; and
process the first image data and the second image data to generate a stereoscopic image.

4. The computer system of claim 3, further comprising:
memory attached to the first substrate and storing a configuration file, the image processor configured to use the configuration file to perform one or more image signal processing algorithms or image settings based at least in part on a selected one of the first imaging element or the second imaging element.

5. The computer system of claim 3, further comprising:
a multiplexer, the multiplexer configured to select between the first and second imaging elements, wherein upon selection of one of the first and second imaging elements, the image processor is configured to process the first image data or the second image data from the selected one of the first and second imaging elements using one or more image signal processing algorithms or settings.

6. The computer system of claim 3, wherein the first imaging element is located on a first surface of the first substrate and the second imaging element is located on a second surface of the first substrate, the first surface being opposite the second surface, and wherein the image processor is attached to at least one of the first surface or the second surface of the substrate.

7. The computer system of claim 3, wherein the first substrate is a multi-layer substrate, and wherein the first imaging element is located on a first layer of the first substrate and the second imaging element is located on a second layer of the first substrate, the image processor being situated between the first layer of the first substrate and the second layer of the first substrate.

8. The computer system of claim 3, wherein the image processor is further configured to:

receive a selection of one of the first and second imaging elements;

retrieve processing information from a configuration file based upon the selection, the processing information indicating one or more image signal processing algorithms or settings operable with the selected one of first and second imaging elements;

process the first image data or the second image data captured from the selected one of the first and second imaging elements using the one or more image signal processing algorithms or settings; and provide the processed data to the at least one processor.

9. The computer system of claim 3, wherein the image processor is configured to be operable with the first imaging element and the second imaging element substantially concurrently, and wherein one of the first image data and the second image data is processed at a time.

10. A computer system, comprising:
at least one processor;
a first imaging element having a first field of view and a second imaging element having a second field of view, the first field of view and the second field of view being different at least in part;
a first substrate having attached thereto the first imaging element and the second imaging element; and
an image processor in communication with the first imaging element and the second imaging element, the image processor configured to:
receive first image data from the first imaging element and second image data from the second imaging element concurrently, wherein the first imaging element is a rear-facing camera and the second imaging element is a front-facing camera; and
process the first image data from the first imaging element and the second image data from the second imaging element to generate a first image in a second image view, the first image being based at least in part on the second image data captured from the second imaging element and the second image being based at least in part on the first image data captured from the first imaging element.

11. A method, comprising:
receiving image data at a module, the module including:
a first imaging element having a first field of view and a second imaging element having a second field of view, the second field of view at least partially overlapping the first field of view;
a first substrate having attached thereto the first imaging element and the second imaging element; and
an image processor in communication with the first imaging element and the second imaging element;
receiving, at the image processor, first image data from the first imaging element and second image data from the second imaging element; and
processing, by the image processor, the first image data and the second image data to generate a stereoscopic image.

12. The method of claim 11, further comprising:
accessing a configuration file by the image processor based at least in part on a selected one or the first imaging element or the second imaging element; and
using, by the image processor, the configuration file to perform one or more image signal processing algorithms or settings on the first image data or the second image data received from the selected imaging element.

13. The method of claim 11, further comprising:
accessing a multiplexer by the image processor; and selecting, by the multiplexer, between the first and second imaging elements, wherein upon selection of one of the first and second imaging elements, the image processor is configured to process the first image data or the second image data from the selected one of first and second imaging elements using one or more image signal processing algorithms or settings.

14. The method of claim 11, wherein the first substrate is a multi-layer substrate, and wherein the first imaging element is located on a first layer of the first substrate and the second imaging element is located on a second layer of the first substrate, the image processor being situated between the first layer of the first substrate and the second layer of the first substrate.

15. The method of claim 11, wherein first imaging element is located on a first surface of the first substrate and the second imaging element is located on a second surface of the first substrate, the first surface being opposite the second surface, and wherein the image processor is attached to at least one of the first surface or the second surface of the first substrate.

16. A non-transitory computer readable storage medium storing one or more sequences of instructions executable by one or more processors to perform a set of operations comprising:
receiving image data at a module, the module including:
a first imaging element having a first field of view and a second imaging element having a second field of view, the first field of view being different at least in part from the second field of view,
a first substrate having attached thereto the first imaging element and the second imaging element, and
an image processor in communication with the first imaging element and the second imaging element;
receiving, at the image processor, first image data from the first imaging element and second image data from the second imaging element substantially concurrently, wherein the first imaging element is a rear-facing camera and the second imaging element is a front-facing camera; and
processing the first image data and the second image data to generate a first image in a second image view, the first image being based at least in part on the second image data captured from the second imaging element and the second image being based at least in part on the first image data captured from the first imaging element.

17. The non-transitory computer readable storage medium of claim 16, further comprising instructions executed by the one or more processors to perform the operations of:
accessing a configuration file by the image processor based at least in part on a selected one or the first imaging element or the second imaging element; and
using, by the image processor, the configuration file to perform one or more image signal processing algorithms on the first image data or the second image data received from the selected imaging element.

18. The non-transitory computer readable storage medium of claim 16, further comprising instructions executed by the one or more processors to perform the operations of:
accessing a multiplexer by the image processor; and
selecting, by the multiplexer, between the first and second imaging elements, wherein upon selection of one of the first and second imaging elements, the image processor is configured to process the first image data or the second data from the selected one of first and second imaging elements using one or more image signal processing algorithms.

19. The non-transitory computer readable storage medium of claim 16, wherein
a combination of the first image data and the second image data covers a three-hundred-and-sixty degree field of view.

* * * * *